US012180354B2

(12) United States Patent
Svensson et al.

(10) Patent No.: US 12,180,354 B2
(45) Date of Patent: Dec. 31, 2024

(54) POLYMER COMPOSITION COMPRISING A BASE POLYMER, AN INORGANIC DESICCANT MATERIAL, AND AN ADDITIVE

(71) Applicant: AIRNOV, INC., Wilmington, DE (US)

(72) Inventors: Dan-Ola Svensson, Ystad (SE); Sebastien Ohl, Malakoff (FR); Valere Logel, Levallois-Perret (FR)

(73) Assignee: AIRNOV, INC., Wilmington, DE (US)

( * ) Notice: Subject to any disclaimer, the term of this patent is extended or adjusted under 35 U.S.C. 154(b) by 975 days.

(21) Appl. No.: 17/046,022

(22) PCT Filed: Mar. 28, 2019

(86) PCT No.: PCT/EP2019/057830
§ 371 (c)(1),
(2) Date: Oct. 8, 2020

(87) PCT Pub. No.: WO2019/197165
PCT Pub. Date: Oct. 17, 2019

(65) Prior Publication Data
US 2021/0032452 A1 Feb. 4, 2021

(30) Foreign Application Priority Data
Apr. 11, 2018 (EP) .................................. 18166714

(51) Int. Cl.
*C08L 23/12* (2006.01)
*B01J 20/26* (2006.01)
*B01J 20/28* (2006.01)
*C08K 3/36* (2006.01)
*C08K 5/00* (2006.01)
*C08K 5/20* (2006.01)

(52) U.S. Cl.
CPC ............. *C08L 23/12* (2013.01); *B01J 20/261* (2013.01); *B01J 20/28026* (2013.01); *C08K 3/36* (2013.01); *C08K 5/0016* (2013.01); *C08K 5/20* (2013.01)

(58) Field of Classification Search
CPC ... C08L 23/12; B01J 20/261; B01J 20/28026; C08K 3/36; C08K 5/0016; C08K 5/20
USPC ........................................................ 502/402
See application file for complete search history.

(56) References Cited

U.S. PATENT DOCUMENTS

| 3,652,521 | A | 3/1972 | Abend et al. |
| 5,849,843 | A | 12/1998 | Laurin et al. |
| 5,911,937 | A | 6/1999 | Hekal |
| 6,130,263 | A | 10/2000 | Hekal |
| 8,006,368 | B2 | 8/2011 | Logel et al. |
| 8,197,925 | B2 | 6/2012 | Sankey et al. |
| 9,452,595 | B2 | 9/2016 | Cartier et al. |
| 2004/0058159 | A1 | 3/2004 | Gagliardi et al. |
| 2006/0269708 | A1 | 11/2006 | Merical et al. |
| 2012/0219781 | A1 | 8/2012 | Babin et al. |
| 2013/0156833 | A1 | 6/2013 | Malet |
| 2014/0005307 | A1 | 1/2014 | Cernohous et al. |
| 2014/0070140 | A1 | 3/2014 | Macchi et al. |
| 2017/0072056 | A1 | 3/2017 | Egberg et al. |
| 2017/0232152 | A1 | 8/2017 | Eustache et al. |

FOREIGN PATENT DOCUMENTS

| CN | 102941061 A | 2/2013 |
| EP | 0 408 501 A2 | 1/1991 |
| EP | 0 454 967 A2 | 11/1991 |
| EP | 0 881 193 B2 | 8/2007 |
| EP | 1 970 188 A1 | 9/2008 |
| EP | 2 364 108 A1 | 9/2013 |
| WO | 99/61856 A1 | 12/1999 |
| WO | 01/46038 A1 | 6/2001 |
| WO | 02/090210 A1 | 11/2002 |
| WO | WO 2005023544 A1 | 3/2005 |
| WO | 2007/135276 A1 | 11/2007 |
| WO | 2007122412 A1 | 11/2007 |
| WO | 2009/030616 A1 | 3/2009 |
| WO | 2009/063089 A1 | 5/2009 |
| WO | 2009/095367 A1 | 8/2009 |
| WO | 2010/009986 A1 | 1/2010 |
| WO | 2014/152539 A1 | 9/2014 |
| WO | 2016/204733 A1 | 12/2016 |

OTHER PUBLICATIONS

International Search Report of the International Searching Authority with Written Opinion dated May 17, 2019, with respect to International Application No. PCT/EP2019/057830.
International Preliminary Report on Patentability of the International Searching Authority dated Oct. 13, 2020, with respect to International Application No. PCT/EP2019/057830.
English translation of Official Communication from the Chinese Patent Office dated Oct. 13, 2022, in corresponding parallel application—CN 201980034850.4.
Rudolf Hager et al., A Novel Product Concept: Silicone Gum Pellets as Additives for Thermoplasts, Plastics Additives, vol. 6, 2004, pp. 27-30 (Abstract only in English).
English translation of Official Communication from the Chinese Patent Office dated Nov. 17, 2021, in corresponding parallel application—CN 201980024850.4.

*Primary Examiner* — Edward M Johnson
(74) *Attorney, Agent, or Firm* — Scott R. Cox (57) ABSTRACT

A polymer composition including a thermoplastic base polymer, and an inorganic desiccant material, selected from the group consisting of molecular sieves, zeolites, silica gel, clay, hydrate salts, metal oxides and mixtures thereof, and an additive, as well as methods of producing the polymer composition and an article of manufacture of the polymer composition.

13 Claims, 4 Drawing Sheets

POLYMER COMPOSITION COMPRISING A BASE POLYMER, AN INORGANIC DESICCANT MATERIAL, AND AN ADDITIVE

FIELD OF THE INVENNTION

The invention pertains to a polymer composition comprising a base polymer, an inorganic desiccant material, and an additive (so called "entrained polymers"), a process for producing such polymer compositions, and products including such polymer compositions.

BACKGROUND

Many moisture-sensitive products must be shipped and stored in conditions that are as free from moisture as possible For example, medications and diagnostic test strips often lose some of their efficacy after prolonged exposure to moisture and are preferably shipped and stored in moisture free environments. Containers for holding such products may be fashioned out of moisture-impermeable material, such as well-known thermoplastics, that resist entry of exterior moisture. However, entry of moisture into such containers inevitable, either through diffusion thought the material forming the wall of the container, through the composition of the goods stored in the container which may contain moisture at their time of manufacturing, or through the repeated opening and closing of the container where multiple product units are contained in a single container.

There are multiple occurrences for exposing the product to humidity. In the case of medication containers or containers including multiple diagnostic test strips, the end-user often opens the plastic container repeatedly in order to obtain just one dosage, exposing the remaining dosages to undesirable moisture-bearing air. Therefore, such containers preferably include means to absorb any moisture that enters the container before it affects the moisture-sensitive product inside.

In order to absorb excess moisture and protect the contained products, desiccating materials have been introduced into the interior of containers. These desiccants are usually in the form of powders or granules and therefore must be contained in some mariner to prevent contamination of the product. Previous attempts to introduce desiccants to such containers have included the use of bags and packets formed from breathable materials, perforated plastic canisters, desiccant tablets and aerated plastic cartridges with the desiccant inside. These containers are problematic, however, as any breakage would release the desiccant freely into the container. Also, these desiccant containers can release some amount of dust originating from the desiccant fill and adversely affect the product to be protected from moisture. Other solutions involve the creation of a separate compartment within the container to hold the desiccant (for example in a desiccant filled stopper for a tube, or a side compartment within the tube), but such a compartment typically limits the moisture-to-desiccant contact and reduces the absorption rate. There is also the ever present danger of damage to the side compartment which will also release desiccant into the main container.

Thus, there is a need for a means of introducing an absorbing agent into a plastic container or other article of manufacture while preventing the absorbing agent from being released and potentially contacting the moisture sensitive product. One means for accomplishing this goal is entraining the absorbing agent directly into a plastic structure, such that the desiccant cannot be released.

EP 0454967 discloses a container which receives products stored in bulk such as pills, tablets or capsules, especially effervescent tablets. It consists of a container body, closed by a cap. The container body is covered on its inner side by a layer of desiccant material. The desiccant layer is made by mixing in a plastic material such as polystyrene (PS), polyethylene (PE) or polypropylene (PP) a desiccant in granular form, in such a way that the desiccant particles are bonded but not completely coated with plastic, leaving a substantial part of their active surface facing the interior space of the container. However, the amount of active substance that can be left freely accessible on the surface, of such a desiccant material is by nature limited and a problem inherent in such structures is that once the absorbing agent is entrained within the plastic, moisture adsorption is reduced.

It is well known that higher moisture absorption capacity can be achieved when the percentage of desiccant in the material composition of the desiccant polymer is increased. But, where the desiccant is incorporated into the material composition in the form of a mineral powder, the mechanical properties of the carrier polymer are strongly modified. An increased amount of mineral desiccant filler generally increases the stiffness but reduces the degree of flexibility of the material composition. Hence, material compositions including high amounts of mineral desiccant fillers are generally showing a reduced elongation at break. Hence, the desiccant parts produced from the material composition may suffer brittleness and some material compositions may not be suitable for applications where mechanical stress or forced deformations are applied to the desiccant parts produced from the desiccant composition.

In this context, there is a need to provide an improved sorbent polymer composition, suitable for being used in a container for storing medical and/or pharmaceutical products sensitive to moisture and/or other gaseous substances, such as oxygen or volatile organic compounds. In particular, there is a need to provide an improved material composition which is easy to process, economical to produce, avoiding desiccant leakage problems, and allowing to quickly absorb the moisture and/or gaseous substances entering the container, including during the opening/closing cycles of the container.

One approach to come to a suitable material composition is based on the proper selection of the base polymer to enhance moisture ingress into entrained polymer. Typical polymers in this context are polyolefins like PP and PE. However, they show low permeability for moisture and thus a slow uptake of moisture into the absorbent material. An alternative the use of PS as a base polymer. PS-based entrained polymers show good moisture ingress. However, with the typical amount of absorbing material needed to effectively remove and store moisture (in the range of above 50 wt %), PS-based entrained polymers show a reduced mechanical stability, e.g. elongation at break. Hence, the desiccant parts produced from such PS-based material compositions suffer brittleness and are not suitable for applications where mechanical stress or forced deformations are applied to the desiccant parts produced from the desiccant entrained polymer composition, either during production, storage or use.

Another approach is the use of additives, such as polyethylene glycol (PEG) or polyethylene oxide (PEO) for enabling, enhancing or supporting the ingress of moisture, oxygen, or other materials, into or through polymers entrained with an active agent, for example, an absorbing or releasing material, as described in, for example U.S. Pat. No.

5,911,937. Such additives may be incorporated into packaging by way of a polymeric sleeve, insert, or package formed of the polymer itself. By using PEG as an additive, moisture uptake speed of entrained polymers can be enhanced, however at the cost of a reduced mechanical stability. Further, water-soluble additives like PEG tend to leach from the entrained polymer composition when in contact with moisture, which is also not desirable.

Such entrained polymers can be useful, for example, in packaging of pharmaceuticals, nutraceuticals, medical devices, foodstuffs, electronics and tobacco products. The entrained polymer, and as a result, some of the additive incorporated therein, will contact the packaged material in these types of applications. As a result, the use of an additive that does not migrate into the packaged product is desirable, so as to avoid contact with or possible consumption of the additive by the consumer. Such an additive may be, for example, a water insoluble polymer, so that contact with moisture in the product does not cause extraction of the additive. As a solution to this problem, WO 2014/152539 suggest the use of a propylene oxide polymerisate-monobutyl ether or a propylene oxide polymerisate as an additive in polypropylene-base polymer compositions, further comprising an absorbing material.

Apart from the requirements for entrained polymers discussed above (i.e., high load of absorbing material, quick moisture uptake, mechanical stability and flexibility, minimized release of additive), there is also the need to optimize the behavior of the entrained polymer during processing, typically injection molding. EP 1970188 describes a method for obtaining injection molded components with moisture adsorptive properties. Advantageously, the moisture adsorbent components can be obtained in a one-shot process, avoiding moisture uptake by the entrained polymer during pelletizing and storage of a pre-made compound of desiccant entrained polymer. The compounder-type injection molding machine comprises an extruder for continuously producing a melt of a desiccant-filled polymer at least one injection device fluidly connected with the extruder by a first conduit to receive melt and including an injection ram movable to a forward position for injection of melt into an injection mold and a rear position for introduction of melt into the injection device.

The complex nature of the process, connecting the continuous process of mixing the desiccant into a polymer with the sequential process of injection molding the desiccant polymer composition, calls for a tight processing window and a demanding set of requirements on the properties of the recipe composing the desiccant entrained polymer. For example, the difference between melt temperature and solidification temperature of the material composition should be kept minimal, such as to maintain viable cycle times. U.S. Pat. No. 8,006,368 describes the use of an in-mold compounder of the above type for forming desiccant inserts comprising 40% to 85% of a desiccant material, preferably a molecular sieve, blended with from about 60 to about 15% of a plastic material, preferably polypropylene, polyethylene or polystyrene.

Hence there is a need overcome the drawbacks of the prior art polymer compositions, in particular there is a need for a polymer composition offering improved performance balance when considering process ability, mechanical properties (e.g. elongation at break), desiccant performance (e.g. capacity and speed of moisture adsorption), non-release of additive or other components when in contact with moisture, and cost of production.

SUMMARY

These and other objectives are solved by the object of the present invention.

In a first aspect, the present invention concerns a polymer composition as defined in independent claim 1. Embodiments of the first aspect of the invention are defined in dependent claims 2 to 8.

In a second aspect, the present invention concerns an article of manufacture comprising the composition of the first aspect of the invention, as defined in independent claim 9. Embodiments of the second aspect of the invention are defined in dependent claim 10.

In a third aspect, the present invention concerns a medical or pharmaceutical packaging comprising the composition of the first aspect of the invention or the article of manufacture of the second aspect of the invention, as defined in independent claim 11.

In a fourth aspect, the present invention concerns a method of producing the polymer composition of the first aspect of the invention, as defined in independent claim 12.

In a fifth aspect, the present invention concerns use of a polyether block amide as an additive in a polymer composition comprising a thermoplastic base polymer and an inorganic desiccant material that acts on, interacts or reacts with moisture and thereby absorbs moisture according to the polymer composition of the first aspect of the invention, disclosed herein. Embodiments of the fifth aspect of the invention are disclosed herein.

BRIEF DESCRIPTION OF THE DRAWINGS

FIG. 1 shows in three sub-figures FIGS. 1A, 1B and 1C the results of moisture uptake tests for several different compositions, plotting the relative weight gain $\Delta w(t)/w_0$ (in %) versus time t (in days).

FIG. 3 shows in three sub-figures 3A, 3B and 3C the recorded force F (in N) versus the compression stroke c (in mm) for a mechanical performance test.

DETAILED DESCRIPTION

The present invention and detailed embodiments of the present invention are disclosed herein, but it should be understood that the disclosed embodiments are merely exemplary of the invention, which may be embodied in various forms. The figures are not necessarily to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The active polymer composition of the invention comprises a thermoplastic base polymer, is an inorganic desiccant material, preferably selected from the group comprising molecular sieves, zeolites, silica gel, clay, hydrate salts, metal oxides and mixtures thereof, and an additive. The additive is a polyether block amide. The inorganic desiccant material is present in an amount of 50 wt % or more. Typically, the inorganic desiccant material absorbs, adsorbs, or releases moisture.

Unless stated otherwise, the wt %-number provides the % of weight of the component over the total weight of the composition.

The primary function of the base polymer is to provide structure and ease of processing for the polymer composition. Typical thermoplastic base polymers include polyolefins, polyisoprene, thermoplastic cellulose, ethylene-vinyl acetate copolymers, ethylene-methacrylate copolymer, ethylene-butacrylate copolymer, acrylonitrile butadiene styrene, polystyrene, styrene-ethylene-butylene-styrene copolymers, styrene-butylene-styrene copolmers, styrene butadiene copolymers, polyesters, polyanhydrides, polysulfones, polyacrylic ester, thermoplastic polyurethane (TPU), polyacetal (POM), polylactic acid (PLA), or mixtures thereof.

Preferably, the base polymer is a polyolefin. Typical polyolefin base polymers include polyolefins, such as homopolymers and copolymers of mono-olefins and di-olefins, for example polypropylene (PP), polyethylene (PE) which optionally can be crosslinked such as high density polyethylene (HDPE), low density polyethylene (LDPE), linear low density polyethylene (LLDPE), or branched low density polyethylene (BLDPE). Polypropylene is especially suitable for the composition of the invention. Suitable polypropylene grades are, e.g., PPM H250 obtainable from Total, Purell HP570R obtainable from Basell, PP 515A obtainable from Sabic, PP ELTEX 100MG25, obtainable from INEOS.

It has turned out that suitable thermoplastic base polymers are polyolefins with a melt flow rate (MFR) of preferably 15 g/10 min or more, more preferably of 20 g/10 min or more when tested according to ISO 1133 (2.16 Kg-230° C.).

Typically, the base polymer is present in the composition of the invention in an amount of 1 to 49 wt %.

In general, the base polymer has a moisture vapor transmission rate (MVTR), also known as water vapor transmission rate (WVTR), which is a measure of the passage of water vapor through a substance, that is substantially lower than, or at least lower than, that of the additive of the polymer composition. The MVTR can be measured according to industry standard ASTM ES96 ("Standard Test Methods for Water Vapor Transmission of Materials"). The additive in the polymer composition of the present invention is a polyether block amide. Polyether block amide or PEBA is a thermoplastic elastomer (TPE). Typical examples of PEBA are known under the tradename of PEBAX® (Arkema), VESTAMID® E (Evonik Industries) and Irgastat® (BASF). It is a block copolymer obtained by polycondensation of a carboxylic acid polyamide (PA6, PA11, PA12) with an alcohol termination polyether (Polytetramethylene oxide—which typically leads to so-called hydrophobic PEBA, or polyethylene oxide—which typically leads to so-called hydrophilic PEBA). The general chemical structure of PEBA is:

HO—(CO—PA—CO—O—PE—OK-H in which PA stands for the polyamide part and PE for the polyether part.

PEBA is a high performance thermoplastic elastomer. It has i. a., been described as a component for waterproof breathable films also comprising starch and thermoplastic polymers (e.g. US 2012/0219781) and—in a composition also containing destructurized starch—as a material for forming articles with dimensional stability (e.g. EP 0408501). PEBA is generally used to replace common elastomers—thermoplastic polyurethanes, polyester elastomers, and silicones—for the following characteristics: lower density among TPE, superior mechanical and dynamic properties (flexibility, impact resistance, energy return, fatigue resistance) and keeping these properties at low temperature (lower than −40° C.), and good resistance against a wide range of chemicals.

Typically, the additive is a hydrophilic or a hydrophobic polyether block amide or a mixture thereof. Exemplary PEBA grades that have proven suitable for the purpose of the present invention are PEBAX® MV1074 SA01 MED (a hydrophilic PEBA) and PEBAX® 4033 a hydrophobic PEBA), both available from Arkema.

Typically, the PEBA additive is present in the composition of the invention in an amount of 1-49 wt %, preferably in an amount of 1 wt % to 15 wt % (1 and 15 wt % being included).

The additive preferably is a polymer in compliance with relevant portions of the USP Class VI and/or ISO 10993 standards.

A further aspect of the invention is the use of a polyether block amide (PEBA) as an additive in a polymer composition comprising a base polymer and an inorganic desiccant material, preferably selected from the group comprising molecular sieves, zeolites, silica gel, clay, hydrate salts, metal oxides and mixtures thereof. In particular, the inorganic desiccant material is present in an amount of 50 wt % or more. Typically for such use is that the polyether block amide is a hydrophilic or a hydrophobic polyether block amide or a mixture thereof. Details of the base polymer, the inorganic desiccant material and the PEBA have been discussed above and will not be repeated here.

The use according to the invention has proven advantageous with PEBA grades PEBAX® MV1074 SA01 MED (a hydrophilic PEBA) and PEBAX® 4033 (a hydrophobic PEBA), both available from Arkema, and PEBA Irgastat® P16 or PEBA Irgastat® P20, both available from BASF, in the quality and amounts discussed above for the inventive polymer composition.

In general, the additive has a moisture vapor transmission rate (MVTR), also known as water vapor transmission rate (WVTR), which is a measure of the passage of water vapor through a substance, that is substantially higher than, or at least higher than that of the base polymer of the polymer composition. The MVTR can be measured according to industry standard ASTM E96 ("Standard Test Methods for Water Vapor Transmission of Materials").

Referring to such a comparison of the base polymer and additive water vapor transmission rate, in one embodiment, the additive has a water vapor transmission rate of at least fifty times that of the base polymer. In another embodiment, the additive has a water vapor transmission rate of at least one hundred times that of the base polymer, in still another embodiment, the additive has a water vapor transmission rate of at least two hundred times that of the base polymer when measured according to ASTM E-96, desiccant method at 38° C. and 90% relative humidity (RH). E.g., when comparing a polypropylene base polymer with a hydrophobic PEBA, the PEBA additive has a water vapor transmission rate greater than 120 times that of the base polymer; with a hydrophilic PEBA this factor is greeter than 400.

In general, the additive has a water vapor transmission rate (measured according to ASTM E-96, desiccant method at 38° C., 90% RH (for a film of 25 μm thickness)) of greater than 1000 g/m²/day. In another embodiment, the additive has a water vapor transmission rate of greater than 4000 g/m²/day, The inorganic desiccant material in the polymer composition of the present invention acts on, interacts or reacts with moisture. It thereby adsorbs, absorbs or releases moisture from or to the environment, respectively. Typically, the inorganic desiccant materials is immiscible with the base polymer and/or the additive in the polymer composition.

Typically, when mixed and heated with the base polymer and the additive, the inorganic desiccant material will not melt, i.e., has a melting point that is higher than the melting point for either the base polymer or the additive. As used herein, the term "melting point" is defined as the first order transition point of the material determined by differential scanning calorimetry (DSC) as customary to those skilled in the art.

The inorganic desiccant material may be in the form of particles.

Suitable inorganic desiccant, materials are materials able to absorb, adsorb or release moisture from or to their surrounding atmosphere. Such materials are for example, silica gel, molecular sieves or zeolites, metal oxides such as calcium oxide, deliquescent salts such as calcium chloride, potassium carbonate or sodium hydroxide, pre-hydrated silica gels, desiccant clays, hydrate salts, and mixtures thereof.

The term "inorganic desiccant" as used herein relates to any inorganic material capable of releasing, absorbing, adsorbing moisture, or of removing moisture from a surrounding atmosphere by any other mechanism such as a chemical reaction. Non-limiting examples of inorganic desiccants include silica gel (including pre-hydrated silica gel), zeolites (also referred to as molecular sieves), desiccant clays, such as bentonite clay and montmorillonite, activated carbon, metal compounds, in particular oxides, chlorides, sulfates and others which have the property to absorb and/or react with water from a surrounding atmosphere. Exemplary metal salts are alkali metal salts and alkaline earth metal salts or oxides such as $Na_2SO_4$, $MgSO_4$, $CaSO_4$, $CaCl_2$, MgO, CaO and BaO.

Examples for zeolites suitable for water absorption are materials known under the name "Linde Type A" (LTA) ("Zeolite A") such as Zeolite MS 3A, Zeolite MS 4A and Zeolite MS 5A. A detailed compilation of zeolites is listed in EP0881193B1 and in "Atlas of Zeolite Framework Types" published on behalf of the Structure Commission of the International Zeolite Association (Ch. Baerlocher W. M. Meier, D. H. Olson, eds., Elsevier 2001).

In preferred embodiments, the inorganic desiccant is selected from the group consisting of silica gel, zeolites, alkaline earth metal oxides such as MgO, CaO, and BaO, and any combination thereof. A particularly preferable inorganic desiccant comprises Zeolite MS 4A.

Specific examples of inorganic desiccants useful in the present invention are selected from the group comprising molecular sieves, zeolites, silica gel, clay, hydrate salts, and mixtures thereof. An exemplary desiccant grade that has proven suitable for the purpose of the present invention is Siliporite® NK10AP, a molecular sieve obtainable from Ceca, Typically, the inorganic desiccant material is present in the polymer composition of the present invention in an amount of 60 wt % or more. Preferably, the inorganic desiccant material is present In the polymer composition of the present invention in an amount of 85 wt % or less. A useful range therefore is from 80 wt % to 85 wt % (range limits included). One preferred embodiment of the polymer composition is characterized in that the polyolefin base polymer is present in amount of 1-49 wt %, the inorganic desiccant material is present in an amount of 50-85 wt %, and the additive is present in an amount of 1-49 wt%.

The composition of the present invention may further comprise additional components known in the art such as plasticizers, stabilizers, lubricators, and coloring agents, and mixtures thereof mixed in the composition. The coloring agent can be added as a colorant master batch such as for example white master batch CM PPN BLANC 551 A, commercially available from PolyOne. In another embodiment, $TiO_2$ pigment was pre-mixed into a PEBA matrix.

The method of the present invention is a process for producing the polymer composition of the invention as defined in any one of claims 1-8. The method comprises alternatives as described below. The terms used in describing the invention, such as base polymer, additive and inorganic desiccant material, have the same meaning as described above in connection with the polymer composition and the use according to the invention.

In a first alternative, the base polymer is heated above its melting point, to produce a molten state. The inorganic desiccant material and the additive are blended into the molten base polymer to uniformity, to produce a polymer composition in a molten state.

In a second alternative, the inorganic desiccant material, base polymer, and additive are blended to uniformity below the melting points thereof. The inorganic desiccant material base polymer, and additive blend is heated above the melting point of one or more of the base polymer and additive, to produce a polymer composition in a molten state.

In a third alternative, the base polymer is heated above its melting point to produce a molten state. The additive is blended into the base polymer and the inorganic desiccant material is blended into the base polymer and the additive blend to form a polymer composition in a molten state.

Is in a fourth alternative, the additive and base polymer are blended below the melting points thereof. The inorganic desiccant material is blended into the base polymer and additive blend, to uniformity. The additive, base polymer and inorganic desiccant material blend is heated above the melting point of at least one of the additive or base polymer, to produce a polymer composition in molten state.

In a fifth alternative, the base polymer and the additive can be first compounded and pelletized. This first compound is melted again and blended with the inorganic desiccant material to produce a polymer composition in molten state.

The molten polymer composition of any of the five alternatives above can then be extruded and cooled to solidify either:
  to form an extruded article of manufacture, for example, a film or a profile; or
  to form pellets or beads. Where pellets or beads are formed, they can in a later step be for example either injection molded, co-injected, extruded, extrusion blow molded, injection blow molded into an article of manufacture;

Alternatively, the molten polymer composition of any of the five alternatives above can be prepared in the extrusion section of an in-mold compounder and then, still in its molten state, be fluidly transferred to the injection molding section of the in-mold compounder where it is introduced into a mold cavity and cooled to solidify, thereby forming a shaped article of manufacture made of the polymer composition.

The molten polymer composition of any of the five alternatives above can be obtained by any compounding technology known from the art, such as for example a twin-screw compounder or other co-malaxer such as a BUSS kneader.

The article of manufacture of the present Invention comprises the polymer composition as disclosed above. Typically, the article of manufacture is a molded article, preferably an injection molded article. Other methods of manufacture are also possible, including extrusion, extrusion blow molding, injection blow molding.

In a preferred embodiment, the article of manufacture is molded using an in-mold compounder, for example as produced by Krauss-Maffei.

In one embodiment, the article of manufacture is an insert, a desiccant cartridge, a flow reducer comprising the polymer composition of the invention.

The article of manufacture produced from the composition of the invention can have any shape. A non-exhaustive list Includes pellets, plates, films, as well as injection molded, blow molded, extruded, or blow-extruded parts. The article of manufacture may be used as a function layer in a multi layer structure for example in multi-layer films, multilayer containers, bottles or vials, as will be detailed below.

Typically, the article of manufacture makes use of the fact that the polymer composition of the present invention has numerous applications. One exemplary application is the construction of rigid containers, which are suitable for containing relatively small volumes of product such as foodstuffs and medicines, in many cases, these types of products must be shipped and stored in controlled environments (e.g., reduced moisture and/or oxygen). In an embodiment, the article of manufacture is an insert. The polymer composition of the present invention may be formed into an insert for inclusion within the Interior of the container. An example of one form of an insert is a plug of any suitable shape, such as a disc shaped plug. While the plug would serve its purpose by being merely deposited within the container, it may also be fixed to an interior location so that it does not move about within the interior space. The plug may be formed into a disc that is shaped and sized to be press fitted snugly into a receiving location at the bottom of a polymeric container or it may be given a shape serving additional functionalities. For example, the desiccant plug of WO2007/135276 was shaped to fit in the neck of the container and to control the flow of distribution of unitary goods such as pills or tablets contained within a container.

In other embodiment of the article of manufacture, a desiccant insert may be formed from the polymer composition of the present invention, this desiccant insert can be formed as a liner having an exterior surface substantially conforming to an interior surface of a container body. Such liners for containers are well known in the art, e.g. from EP2207727. Alternatively, the desiccant insert can be formed such as to create a hollow space between the insert and the vial body such as known from EP2634108 or the shape of the insert can be further adapted to better host lameliar goods such as described by WO2009/030616.

Like the plug described above, the desiccant insert liner may be sized so as to be press-fit into position within the container body where it is held sufficiently snugly to prevent unintended disengagement therefrom. A process for manufacturing such a container is known from WO2009/095367.

Alternatively, either the plug or the liner may be initially constructed and allowed to harden, and then the container body subsequently constructed thereabout so that the greater shrinkage characteristics of the polymeric container body not containing an entrained polymer composition, cause the container body to tightly shrink fit about the plug or the liner so that neither becomes easily disengaged from the other. In still a further embodiment, the insert taking the form of either a plug or a liner may be simultaneously comolded with the container body so that each is integrally joined with the other. In another embodiment, a hollow space is provided.

In yet another embodiment of the article of manufacture, the polymer composition of the present invention may be used to form an entrained polymer sheet that is joined with another sheet made from a different polymer. The two sheets are effectively laminated one to the other so that sheet (not made from the polymer composition of the present invention) can form a substantially as impermeable exterior layer. The laminate of sheets may then be used to wrap an item which is to be stored in a controlled environment. The two sheets could be joined by, for example, thermal extrusion. Such sheets are well known in the art, e g. from US2006/0269708.

The invention also relates to a packaging comprising the composition of the invention and/or the article of manufacture of the invention. It can for example be a moisture-tight packaging comprising a molded article made of the polymer composition of the invention.

The packaging can be a sealed pouch comprising one or more articles for example to preserve them from moisture, a vial (with insert), a pharmaceutical or medical packaging.

The invention also relates to a medical or pharmaceutical packaging element comprising the composition of the invention and/or the article of manufacture of the invention.

EXAMPLES

The present invention will be illustrated in greater detail by the following specific examples. It is understood that these examples are given by way of illustration and are not meant to limit the disclosure or claims. For example, although specific relative humidity and temperature values may be provided, the polymer composition of the present invention is also suited for other conditions. All percentages in the examples or elsewhere in the specification are by weight unless otherwise specified.

As will be apparent from the following examples, the polymer composition, the use, the method and the article of manufacture of the present invention solve the problems addressed above. In particular, the invention provides mechanically flexible, easy and economically to process compositions (and corresponding methods, uses and articles) that exhibit a high speed of moisture uptake. Surprisingly, this can be achieved with comparably low amounts of PEBA additive. The polymer composition of the present invention can even be used in an in-mold compounding unit which allows a one-stop process of compounding and injection molding. The overall effect achieved with the polymer composition of the invention is high moisture uptake speed with uncompromised mechanical stability and excellent ease of processing.

Table 1: Tested Material Compositions.

For all polymer compositions, the %-number provides the % of weight of the component over the total weight of the composition. Compositions C3 to C6, and C9 to C11 are polymar compositions according to the invention; compositions (C1, C2, C7, and C8 are comparative compositions. In terms of the present invention, polypropylene and polystyrene qualify as the base polymer; the molecular sieve qualifies as the inorganic desiccant material, and the polyether block amide and the polyethylene glycol PEG function as additive, intended to enhance moisture uptake.

TABLE 1

| Composition Number | Composition [in weight-%] | Source end Type |
|---|---|---|
| C1 | 35% Polypropylene<br>65% Molecular Sieve | Total, PPM H250<br>CECA, Siliporite NK10AP |
| C2 | 40% Polystyrene<br>60% Molecular Sieve | INEOS Styrenics, Empera 116N CECA, Siliporite NK10AP |
| C3 | 34% Polypropylene<br>1% Polyether Slock Amide<br>65% Molecular Sieve | Total, PPM H250<br>Arkema, PEBAX MV1074 SA01 MED CECA,<br>Siliporite NK10AP |
| C4 | 33% Polypropylene<br>2% Polyether Block Amide<br>65% Molecular Sieve | Total, PPM H250<br>Arkema, PEBAX MV1074 SA01 MED CECA,<br>Siliporite NK10AP |
| C5 | 32% Polypropylene<br>3% Polyether Block Amide<br>65% Molecular Sieve | Total, PPM H250<br>Arkema, PEBAX MV1074 SA01 MED CECA,<br>Siliporite NK10AP |
| C6 | 31% Polypropylene<br>3.4% Polyether Block Amide<br>0.6% TiO2<br>65% Molecular Sieve | Total, PPM H250<br>Arkema, PEBAX 4033 Huntsman, Tioxide R-FC5 CECA,<br>Siliporite NK10AP |
| C7 | 31% Polypropylene<br>65% Molecular Sieve<br>4% PEG | Sabic, 515A<br>CECA, Siliporite NK10AP Clariant, Polyglykol 3350 P |
| C8 | 27% Polypropylene<br>65% Molecular Sieve<br>8% PEG | Sabic, 515A<br>CECA, Siliporite NK10AP Clariant, Polyglykol 3350 P |
| C9 | 32% Polypropylene<br>3% Polyether Block Amide<br>65% Molecular Sieve | Basell, Purell HP570R<br>Arkema, PEBAX MV1074 SA01 MED CECA,<br>Siliporite NK10AP |
| C10 | 29% Polypropylene<br>6% Polyether Block Amide<br>65% Molecular Sieve | Basell Purell HP570R)<br>Arkema, PEBAX MV1074 SA01 MED CECA,<br>Siliporite NK10AP |
| C11 | 26% Polypropylene<br>9% PEBA<br>65% Molecular Sieve | Basell, Purell HP570R)<br>Arkema, PEBAX MV1074 SA01 MED CECA,<br>Siliporite NK10AP |

Example 1

Moisture Uptake & Molding Performance

Moisture Uptake Test Method

Molded desiccant components were produced from the compositions of Table 1.

Compositions 1 to 6 were produced and injection molded by a single step process on an in-mold compounder (Krauss-Maffel) equipped with a multi-cavity injection mold.

Compositions 7 to 11 were produced and injection molded by a two-step process.

First, the compositions were produced by introducing in gravimetric dosing proportion the base polymer, the additive and the desiccant into a Leistritz ZSE 27HP/40D twin screw extruder. The base polymer was introduced into the main hopper and melted at a temperature set point of 180° C. The additive and the desiccant are added, in gravimetric dosing proportions, to the base polymer melt via side-feeder, at a down-stream location of the twin-screw extruder (first third). The melt is extruded into a strand, cooled in water bath before being pelletized.

Second the above pelletized composition was introduced in an injection molding machine (Arburg 100T), heated above the melting temperature an injection molded into a single cavity injection mold to form the same molded desiccant component as tested for compositions 1 to 8.

The geometry of the molded desiccant components samples was a cylinder with closed bottom having the following dimensions:

Total exchange surface of the surface of desiccant insert: 65 cm$^2$

Total volume of material: 4.0 cm$^3$

Average thickness of the sample: 1.25 mm

These molded desiccant components were assembled in a cylindrical vial body, meant for containing moisture sensitive goods. For the purpose of the test, the vials were left unsealed such as the inner surface of the vial and the desiccant component are exposed to environmental humidity.

Each vial samples are identified with a unique sample identification number.

Each of the sampled is weighted and their initial weight (weight after production operations: hereinafter denoted as $m_0$) is recorded.

For the full duration of the test, samples are stored in a climatic chamber, regulated at 30° C. and 65% of relative humidity.

At different points in time, the samples are taken out of the climatic chamber for a time as short as needed to record their individual weight. The weight at time t (w(t)) is recorded with the corresponding time stamp. The samples are returned into the climatic chamber.

The weight is compared to the initial weight. The weight gain $\Delta w(t)$ expressed as the difference between the weight at t (w(t)) and the initial weight ($w_0$) ($\Delta w(t) = w(t) - w_0$) is representative of the amount of moisture collected by the sample, and the relative weight gain $\Delta w(t)/w_0$ is recorded over time (expressed in %.).

The injection molding pressure is obtained from a pressure sensor (HYDAC ELECTRONIC) equipped on the in-mold compounder and represents the polymer melt pressure in the injection nozzle of the in-mold compounder.

Moisture Uptake and Molding Pressure Test Results

Table 2 summarizes the results for tests conducted on compositions C1-C6 identified in Table 1, namely:

Moisture uptake speed test: the time needed to achieve a weight gain of 8%. The shorter the time recorded is, the better the performance of the polymer composition.

Process condition test (molding pressure test): The injection molding pressure required to form the same desiccant component for each of the material compositions is recorded. The lower the pressure that needs to be applied is, the easier the molding is done.

TABLE 2

| Composition Number | Time to achieve 8% weight gain | Maiding pressure as recorded |
|---|---|---|
| C1 | about 50 days | 1300-1450 bars |
| C2 | about 8 days | 1800-2000 bars |
| C3 | about 25 days | 1300-1450 bars |
| C4 | 10 days | 1300-1000 bars |
| C5 | 6 days | 1300-1550 bars |
| C6 | 25 days | 1300-1550 bars |

Polypropylene-based desiccant entrained polymer C1 was used as a reference standard. While it shows good results in the process condition test (relatively low molding pressure needed), it shows a slow moisture adsorption speed.

Polystyrene based composition C2 was found to have a quick moisture uptake speed, however it was impossible to increase the desiccant fill rate above 60% in weight. Limiting factor was the molding pressure required to fill the mold cavities with such a material composition. A comparably low amount of molecular sieve (60 wt %-compared to 65 wt % in C1, C3-C6) raised the required molding pressure by approximately 30%. Flow properties of composition C2 are such that processing limits set by the molding equipment are nearly reached. Also, cavity filling becomes difficult, especially for shapes including thin walls.

Further, as will be detailed later under the section disclosing results for mechanical testing, this C2 material offered very low elongation at breakage and may therefore be improper for being used in applications where desiccant components are required to allow mechanical deformation without breaking.

Surprisingly, it was found that the addition of very low amounts of Polyether Block Amide into a composition of polypropylene with desiccant already results in a substantial increase of moisture adsorption speed, without negatively impairing the ease-of-processing.

The time needed to adsorb 8% in weight of moisture was reduced by a factor 2 comparing a composition comprising an amount as low as 1% of PEBA and further comprising 34% of polypropylene and 65% of desiccant (C3) with a reference composition comprising 35% of polypropylene and 65% of desiccant (C1).

Figure 1A:
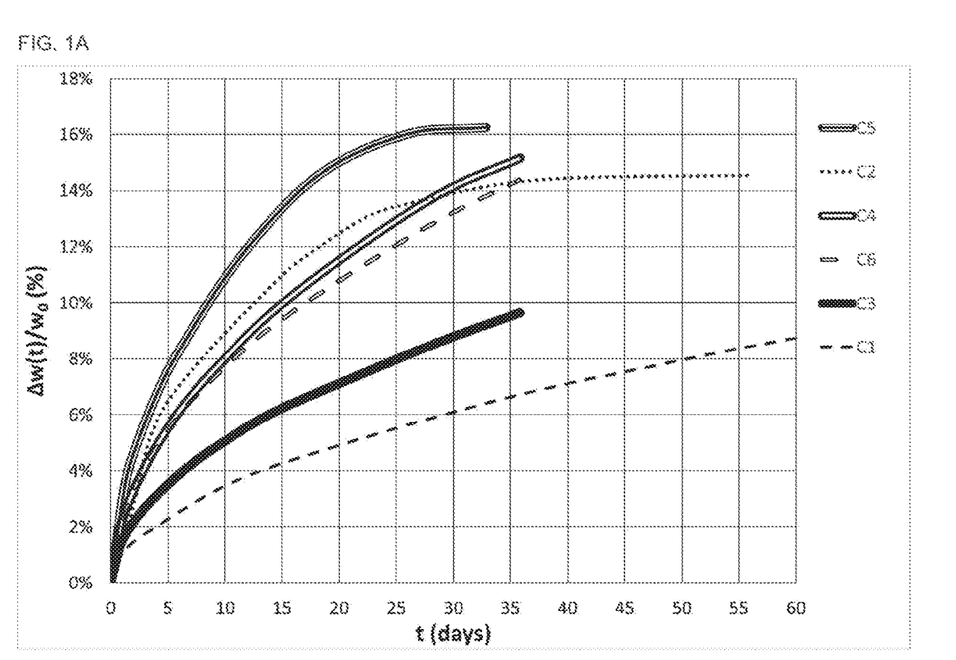

This surprising effect is even observed where a hydrophobic grade of PEBA is used. As shown in FIG. 1A, the time needed to adsorb 8% in weight of moisture was reduced by a factor of 2 when comparing a composition comprising an amount as low as 3.4% of hydrophobic PEBA and further comprising 31% of polypropylene, 0.6% of $TiO_2$ pigment and 65% of desiccant (C6) with a reference composition comprising 35% of polypropylene and 65% of desiccant (C1).

The results of the moisture uptake tests for compositions no. C1-C6 are shown also in FIG. 1A. The amount of moisture taken up by the test samples made form compositions C1-C6 is recorded as the relative weight gain $\Delta w(t)/w_0$ (in %) on the y-axis versus time t (in days) on the x-axis.

Figure 1B:
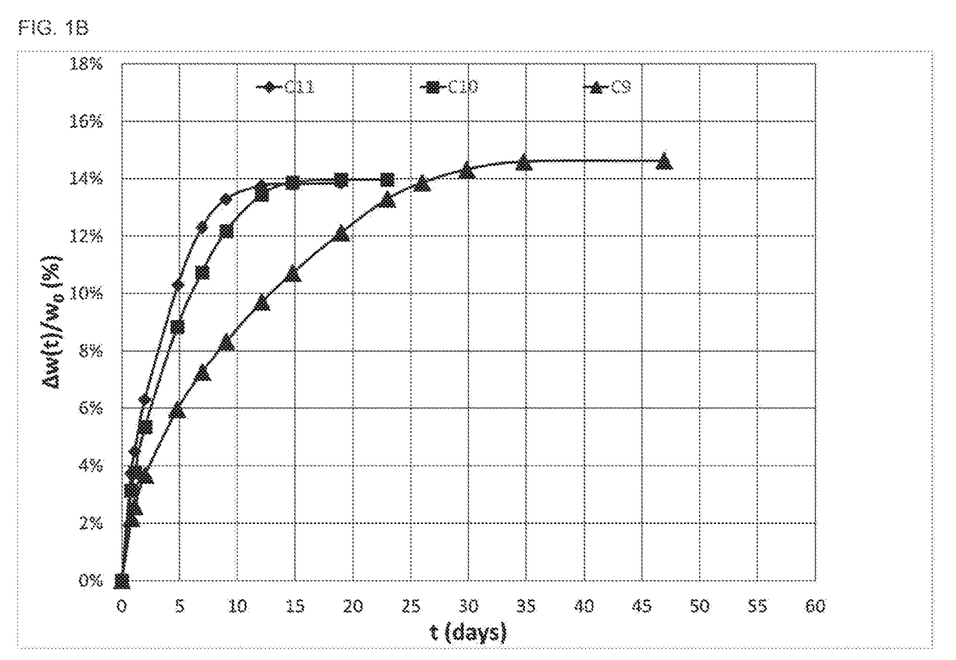

The same test protocol as already described for samples from compositions C1 to C6 was applied for samples from compositions C9 to C11. The moisture uptake test results are shown in FIG. 1B.

It was found that an increased amount of additive within the composition resulted in an increased speed of moisture uptake. In general, it was found that a good balance between moisture uptake speed, ease of processing and production cost is achieved for a polymer composition with PEBA amounts of 15 wt % or lower.

Figure 1C:
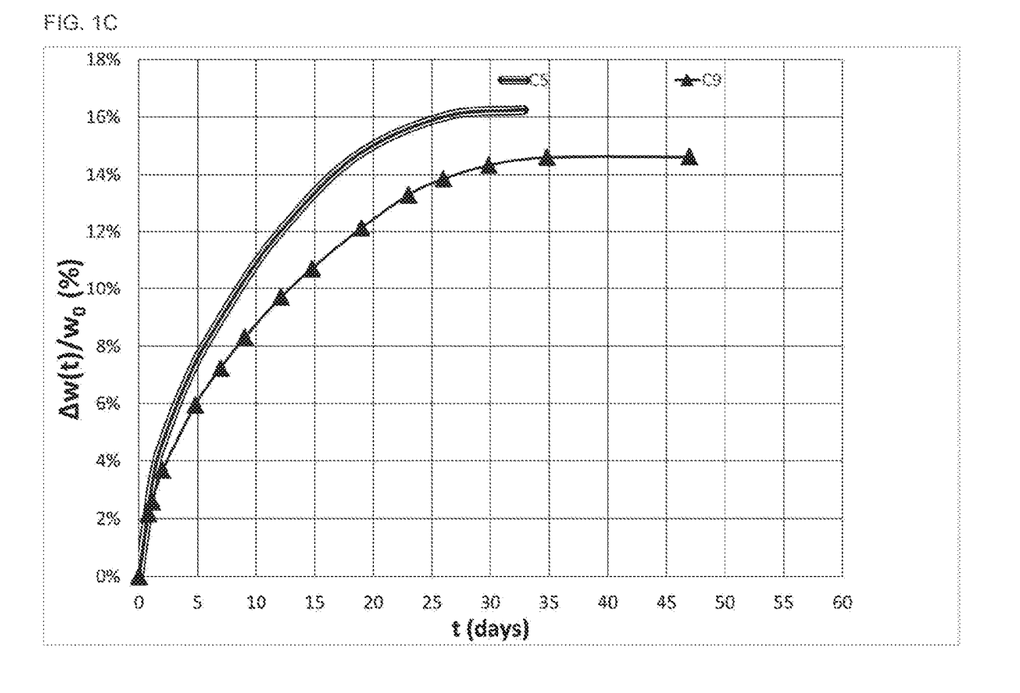

FIG. 1C is comparing the moisture uptake of samples made from composition C5 produced using an in-mold compounder with samples made from composition C9 produced by a two-step process consisting in preparing the pelletized composition C9, before and separately of molding C9 into a molded desiccant component.

Despite their similar composition the molded desiccant components from C5 performed better than the molded desiccant components from C9. A possible explanation is that the one-step process used to produce the samples from C5 avoids exposure of the composition to humidity during manufacturing and storing the pelletized active polymer composition.

Example 2

Mechanical Performance Test

Hollow rings made of the polymer compositions with Composition Numbers C1 to C8 (as defined in Table 1) have been tested for mechanical resistance. Rings have been cut from the injection molded cylinders made from the polymer compositions (as explained above).

Dimensions of the rings were:
Outer diameter: 22.5 +/−0.3 mm
Width: 14+/−0.5 mm
Thickness: 1.6+/−0.1 mm.

Figure 2:
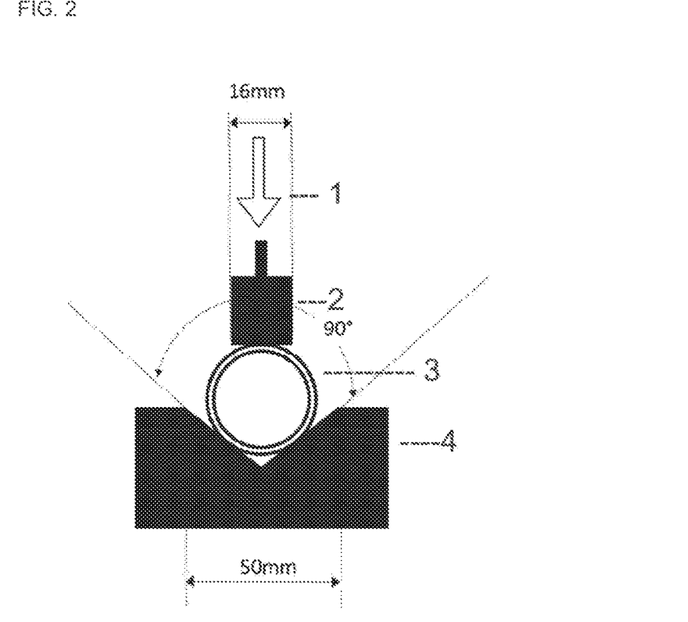
FIG. 2 shows a schematic setup for a mechanical stress test on a tested sample that was injection molded from the polymer composition of the invention.

The rings made of the different compositions were located in a steel V-shaped gauge, the "V" having an angle of 90° and the length of the opening being 50 mm as shown in FIG. 2.

Force has been applied by a cylindrical compression gauge having an outer diameter of 16 mm at a constant compression speed of 150 mm/min, using a force tester (Chatillon CS2 225 Series equipped with a force sensor CLC Series 200 LB 03 87).

The principle setup of the mechanical performance test is shown in FIG. 2, in which
1 indicates an arrow that represents the applied mechanical compression force;
2 indicates the compression gauge;
3 indicates the tested samples in the form of a hollow ring: and
4 indicates the V-shaped gauge that holds the hollow sample ring.

Elongation at break was recorded for each of the tested specimen. Table 3 provides the summarized results: average compression stroke in mm, Standard Deviation (SD) and the SD/Mean value (in %) for the 10 samples tested per polymer composition The compression stroke at breakage (equivalent to the elongation at break) was considered as the compression stroke for which the applied force had reached its maximum.

Figure 3A:
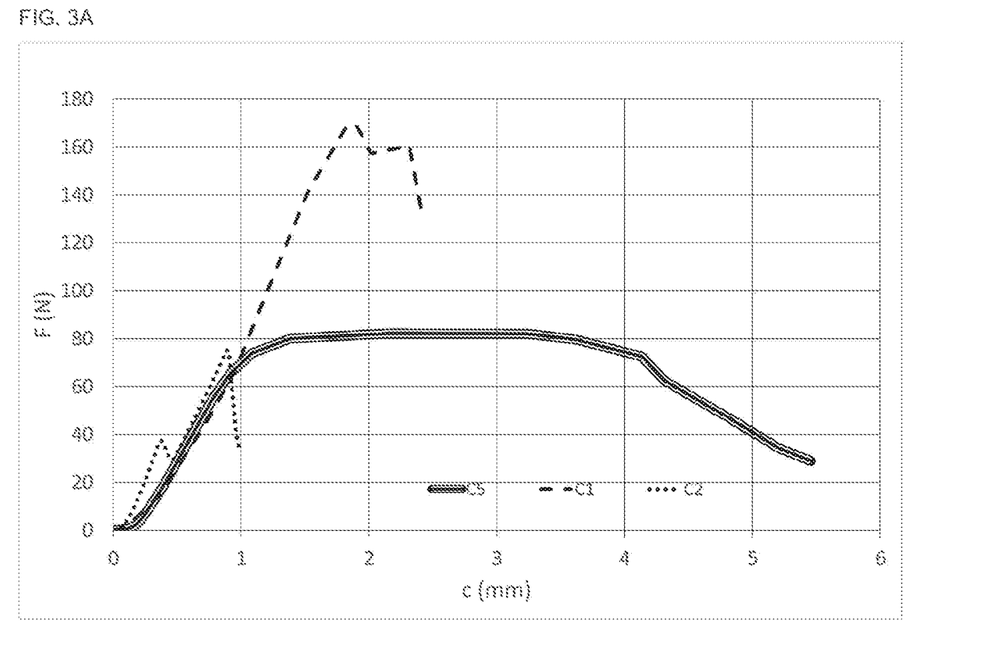
Figure 3B:
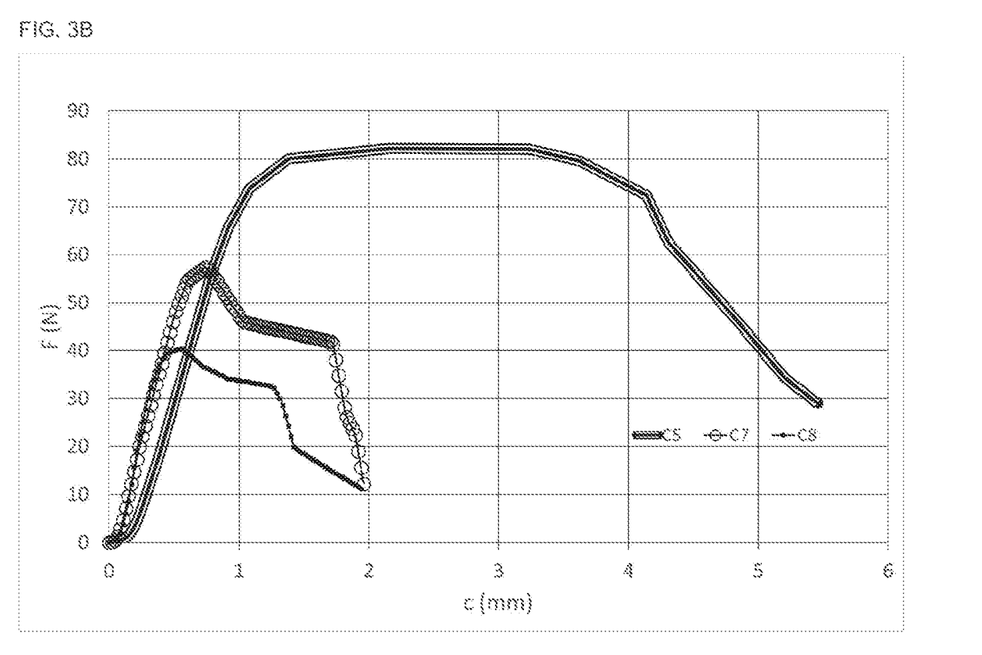
Figure 3C:
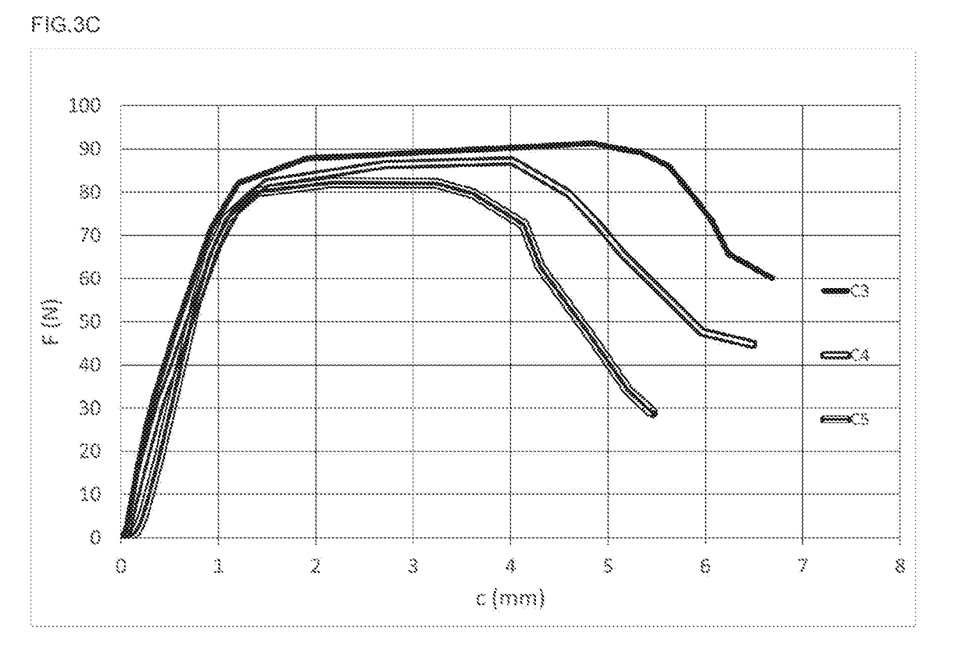

FIG. 3 shows in three sub-figures FIGS. 3A, 3B and 3C the recorded force F (in N) versus the compression stroke c (in mm) of one sample per polymer composition. As can be seen e.g. for composition C1 in FIG. 3A, the maximum force F was reached at a compression stroke c of 1.9 mm (the average compression stroke at breakage is 1.8 mm for the 10 samples made of the composition C1).

TABLE 3

| Composition Number | Average compression stroke at breakage (mm) | SD | SC/Mean |
| --- | --- | --- | --- |
| C1 | 1.8 | 0.4 | 20% |
| C2 | 0.9 | 0.07 | 10% |
| C3 | 4.9 | 0.50 | 10% |
| C4 | 4.2 | 0.7 | 15% |
| C5 | 2.7 | 1 | 35% |
| C7 | 0.90 | 0.2 | 20% |
| C8 | 0.7 | 0.2 | 25% |

As can be seen from the results, the addition of PEBA in the samples according to the invention (C3-C5) greatly increased the ability to accept and resist mechanical deformation compared to the reference compounds (C1, C2, C7, C8).

As can be seen from Table 3 and FIGS. 3A-C, the samples made of the polymer compositions according to the invention (C3-C5) not only show a higher average compression stroke, but also the force that can be applied to this samples prior to the point of breakage was increased compared to the comparative samples (C2, C7, C8).

In addition, as can be seen from the shape of the curves recorded for the polymer compositions according to the invention (C3-C5) (cf, FIGS. 3A-C), their breakage mode is different from the comparative samples: the compositions according to the invention show an increased elastic domain (broad plateau) in comparison to the comparative samples (C1, C2, C7, C8).

As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

The invention claimed is:

1. A polymer composition comprising:
   a thermoplastic base polymer,
   an inorganic desiccant material, and
   an additive;
   wherein the additive consists of a polyether block amide, and wherein the inorganic desiccant material is present in an amount of 50 wt % or more.

2. The composition of claim 1, wherein the thermoplastic base polymer consists of a polyolefin polymer.

3. The composition of claim 1, wherein the inorganic desiccant is selected from the group consisting of molecular sieves, zeolites, silica gel, clay, hydrate salts, metal oxides and mixtures thereof.

4. The composition of claim 3, wherein the inorganic desiccant is selected from the group consisting of molecular sieves, silica gel and mixtures thereof.

5. The composition of claim 1, wherein the additive is selected from the group consisting of a hydrophilic polyether block amide, a hydrophobic polyether block amide and mixtures thereof.

6. The composition of claim 1, wherein the inorganic desiccant material is present in an amount of 60 wt % or more.

7. The composition of claim 1, wherein the thermoplastic base polymer is present in an amount of 1-49 wt %,
   the inorganic desiccant material is present in an amount of 50-85 wt %, and
   the additive is present in an amount of 1-49 wt %.

8. The composition of claim 1, wherein the composition further comprises at least one additional component selected from the group consisting of plasticizers, stabilizers, lubricators, coloring agents, and mixtures thereof.

9. An article of manufacture comprising the composition of claim 1.

10. The article of manufacture of claim 9, wherein the article is a molded article.

11. A medical or pharmaceutical packaging comprising the composition of claim 1.

12. A method of producing the polymer composition of claim 1 selected from the group consisting of:
    i) heating the base polymer above its melting point to produce a molten state; blending the inorganic desiccant material and the additive into the base polymer to uniformity to produce an entrained polymer mixture;
    ii) blending to uniformity the inorganic desiccant material, base polymer, and additive below the melting points thereof; heating the inorganic desiccant material, base polymer, and additive above the melting point of one or more of the base polymer and additive to produce an entrained polymer mixture in a molten state;
    iii) heating the base polymer above its melting point to produce a molten state; blending the additive into the base polymer; blending the inorganic desiccant material into the base polymer and the additive to form an entrained polymer mixture; and
    iv) blending the additive and base polymer below the melting points thereof; blending the inorganic desiccant material into the base polymer and additive to uniformity; heating the additive, base polymer and inorganic desiccant material above the melting point of at least one of the additive or base polymer, to produce an entrained polymer mixture in a molten state.

13. The composition of claim 1 wherein the thermoplastic base polymer is a polypropylene polymer.

* * * * *